United States Patent
Maeda

(10) Patent No.: US 12,447,774 B2
(45) Date of Patent: Oct. 21, 2025

(54) TIRE

(71) Applicant: Sumitomo Rubber Industries, Ltd., Kobe (JP)

(72) Inventor: Yohei Maeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 238 days.

(21) Appl. No.: 18/142,293

(22) Filed: May 2, 2023

(65) Prior Publication Data
US 2023/0391142 A1    Dec. 7, 2023

(30) Foreign Application Priority Data
Jun. 3, 2022    (JP) .................................. 2022-091094

(51) Int. Cl.
*B60C 11/00*    (2006.01)
*B60C 11/03*    (2006.01)
(Continued)

(52) U.S. Cl.
CPC ........ *B60C 11/005* (2013.01); *B60C 11/0008* (2013.01); *B60C 11/0302* (2013.01);
(Continued)

(58) Field of Classification Search
CPC ............. B60C 11/0041; B60C 11/0058; B60C 11/0323; B60C 11/1315; B60C 11/1353;
(Continued)

(56) References Cited

U.S. PATENT DOCUMENTS

| | | | |
|---|---|---|---|
| 6,516,847 B1 * | 2/2003 | Amaddeo | B60C 1/0016 156/96 |
| 11,548,322 B2 | 1/2023 | Baranger | |

(Continued)

FOREIGN PATENT DOCUMENTS

| | | |
|---|---|---|
| CN | 110948764 A | 4/2020 |
| EP | 3 098 089 A1 | 11/2018 |

(Continued)

OTHER PUBLICATIONS

Extended European Search Report for European Application No. 23170998.1, dated Oct. 9, 2023.

*Primary Examiner* — Blaine Copenheaver
*Assistant Examiner* — Wendy L Boss
(74) *Attorney, Agent, or Firm* — Birch, Stewart, Kolasch & Birch, LLP

(57) ABSTRACT

A tire includes a tread portion having a ground contacting surface and a first groove. A tread rubber forming the tread portion includes a first rubber layer and a second rubber layer. The second rubber layer has a complex elastic modulus smaller than a complex elastic modulus of the first rubber layer. The first groove includes a first groove edge, a groove bottom surface, and a first groove wall. In a lateral cross section of the first groove, the first groove wall includes a first wide top portion arranged between the first groove edge and the groove bottom surface and located outside the first groove edge in a groove width direction of the first groove. The first wide top portion is positioned in the second rubber layer.

20 Claims, 4 Drawing Sheets

(51) Int. Cl.
*B60C 11/12* (2006.01)
*B60C 11/13* (2006.01)

(52) U.S. Cl.
CPC ...... *B60C 11/1204* (2013.01); *B60C 11/1307* (2013.01); *B60C 11/1323* (2013.01); B60C 2011/0025 (2013.01); B60C 2011/1213 (2013.01)

(58) Field of Classification Search
CPC ........... B60C 11/005; B60C 2011/0025; B60C 2011/133; B60C 2011/0383
See application file for complete search history.

(56) References Cited

U.S. PATENT DOCUMENTS

| | | |
|---|---|---|
| 2015/0343851 A1 | 12/2015 | Kaneko |
| 2018/0333993 A1 | 11/2018 | Fujimoto et al. |
| 2022/0410629 A1 | 12/2022 | Fabing et al. |
| 2024/0025213 A1 * | 1/2024 | Eikermann ............. B60C 11/13 |

FOREIGN PATENT DOCUMENTS

| | | | | |
|---|---|---|---|---|
| EP | 3552847 A1 * | 10/2019 | ......... | B60C 11/0309 |
| EP | 3 950 381 A1 | 2/2022 | | |
| EP | 3950386 A1 * | 2/2022 | ......... | B60C 11/0008 |
| JP | 2018-193056 A1 | 12/2018 | | |
| WO | WO 2011/048516 A1 | 4/2011 | | |
| WO | WO 2014/102039 A1 | 7/2014 | | |
| WO | WO-2017074410 A1 * | 5/2017 | ......... | B60C 11/0058 |
| WO | WO 2018/122791 A1 | 6/2019 | | |
| WO | WO 2021/089962 A1 | 5/2021 | | |

\* cited by examiner

TIRE

RELATED APPLICATIONS

This application claims the benefit of foreign priority to Japanese Patent Applications No. JP2022-091094, filed Jun. 3, 2022, which are incorporated by reference in its entirety.

FIELD OF THE INVENTION

The present disclosure relates to a tire.

BACKGROUND OF THE INVENTION

Japanese Unexamined Patent Application Publication No. 2018-193056 has proposed a tire having a tread portion provided with a plurality of oblique grooves. This tire is expected to have improved on-snow performance due to the above-mentioned oblique grooves.

SUMMARY OF THE INVENTION

In general, as wear progresses on the tread portion of the tire, the volume of the grooves formed in the tread portion decreases, resulting in deteriorated on-snow performance.

The present disclosure was made in view of the above, and a primary object thereof is to provide a tire capable of maintaining the on-snow performance even when wear progresses in the tread portion.

The present disclosure is a tire including a tread portion, wherein
  the tread portion includes a ground contacting surface, and at least one first groove opening at the ground contacting surface,
  a tread rubber forming the tread portion includes a first rubber layer not exposed at the ground contacting surface and a second rubber layer connected to the first rubber layer on an outer side in a tire radial direction,
  the second rubber layer has a complex elastic modulus $E*2$ smaller than a complex elastic modulus $E*1$ of the first rubber layer,
  the or each first groove includes a first groove edge, the first groove edge being one of two groove edges of the or each first groove appearing on the ground contacting surface, a groove bottom surface located radially inside the second rubber layer, and a first groove wall connecting the first groove edge and the groove bottom surface,
  in a lateral cross section of the or each first groove, the first groove wall includes a first wide top portion between the first groove edge and the groove bottom surface,
  the first wide top portion is located outside the first groove edge in a groove width direction of the or each first groove, and
  the first wide top portion is positioned in the second rubber layer.

By adopting the above configuration, it is possible that the tire of the present disclosure maintains the on-snow performance even when wear in the tread portion progresses.

DETAILED DESCRIPTION OF THE INVENTION

Figure 1:
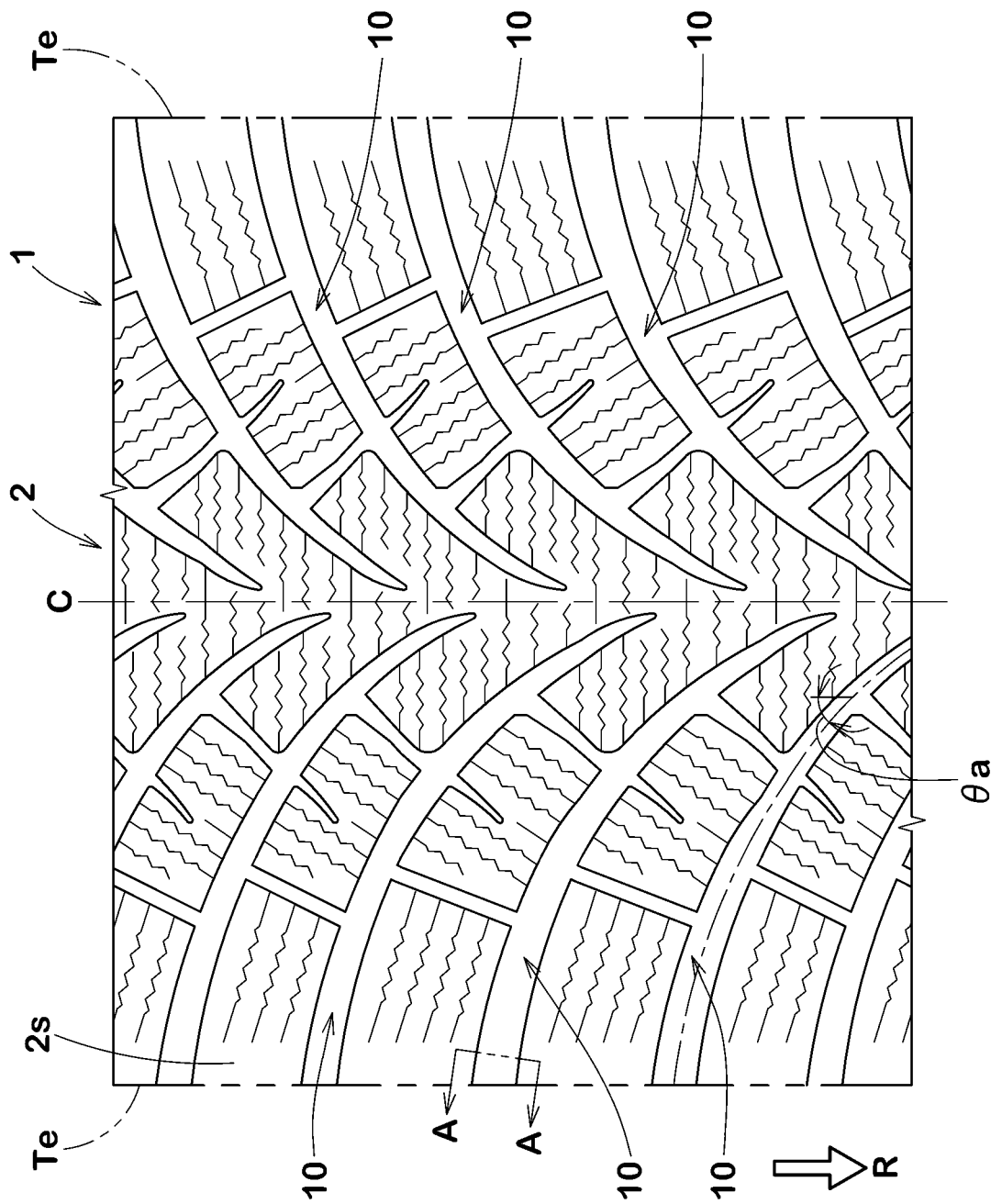
FIG. 1 is a is a development view of a tread portion of a tire in embodiments of the present disclosure.

Embodiments of the present disclosure will now be described below in conjunction with accompanying drawings. FIG. 1 is a development view of a tread portion 2 of a tire 1 of the first and the second embodiments in a standard state. As shown in FIG. 1, the tire 1 is suitably used as a winter pneumatic tire for passenger cars, for example. In other aspects of the present disclosure, the tire 1 can be used as a heavy-duty pneumatic tire or a non-pneumatic tire in which the tire is not filled with pressurized air, for example.

The term "standard state" refers to a state in which the tire is mounted on a standard rim, inflated to a standard inner pressure, and loaded with no tire load, in the case of pneumatic tires for which various standards have been established. In the case of tires for which various standards have not been established, the standard state means a state in which the tire is not mounted on a vehicle and loaded with no tire load, which is a standard usage state according to the purpose of use of the tire. In the present specification, unless otherwise specified, the dimensions and the like of various parts of the tire are the values measured in the standard state.

The term "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The term "standard inner pressure" refers to air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The tire 1 of the first embodiment has a directional pattern bound with an intended tire rotational direction (R), for example. The tire rotational direction (R) is indicated by letters or symbols on a sidewall portion (not shown), for example.

The tread portion 2 includes a ground contacting surface (2s) and at least one first groove 10 opening at the ground contacting surface (2s). The tread portion 2 of the first embodiment is provided with a plurality of the first grooves 10. Each of the first grooves 10 is inclined to a heel side (leading side) in the tire rotational direction (R) described above as it extends from a respective one of tread edges (Te) on both sides in a tire axial direction to a tire equator (C), for example. Further, each of the first grooves 10 terminates to have a closed terminating end without reaching the tire equator (C). However, the present invention is not particularly limited to the above-mentioned shape or the configuration of the first grooves 10 in a plan view of the tread portion 2 (hereinafter, may be referred to as "tread plan view").

Figure 2:
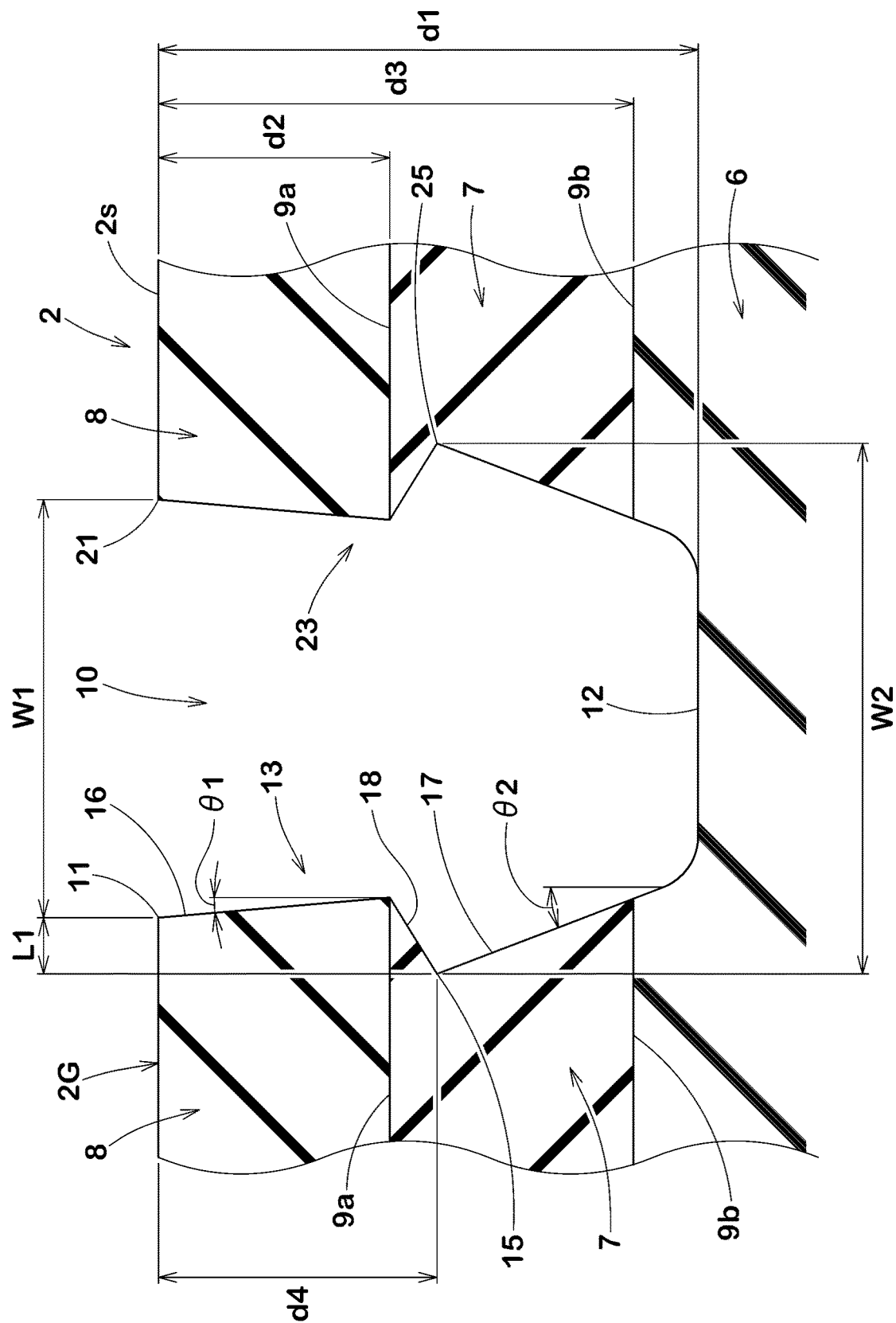
FIG. 2 is a cross-sectional view of a tread rubber and a first groove of FIG. 1.

FIG. 2 shows a cross-sectional view of a tread rubber 2G forming the tread portion 2 and one of the first grooves 10. FIG. 2 corresponds to a cross-sectional view taken along A-A line of FIG. 1 and shows a lateral cross-section perpendicular to a longitudinal direction of the first groove 10. As shown in FIG. 2, the tread rubber 2G includes a first rubber layer 6 that is not exposed at the ground contacting surface (2s) and a second rubber layer 7 connected to the first rubber layer 6 on an outer side in a tire radial direction. Further, the second rubber layer 7 has a complex elastic modulus $E*2$ smaller than a complex elastic modulus $E*1$ of the first rubber layer 6. It is known that a rubber layer with a small complex elastic modulus $E*$ has excellent flexibility and provides a large gripping force on wet or snowy road surfaces when it appears on the ground contacting surface.

The complex elastic modulus $E*$ is a value measured by using a viscoelastic spectrometer (for example, a testing machine available from GABO) under the following conditions according to Japanese Industrial Standard JIS-K6394.

Initial strain: 10%
Amplitude: ±2%
Frequency: 10 Hz
Deformation Mode: Tensile
Measurement temperature: 30° C.

Each of the first grooves 10 includes a first groove edge 11, a groove bottom surface 12, and a first groove wall 13 connecting the first groove edge 11 and the groove bottom surface 12. The first groove edge 11 is one of the two groove edges appearing on the ground contacting surface (2s). The groove bottom surface 12 is located radially inside the second rubber layer 7, and it is located in the first rubber layer 6 in the first embodiment.

The groove edges of each of the first grooves 10 correspond to the boundaries between the ground contacting surface and a groove opening when the tire 1 in the standard state is in contact with a flat surface with zero camber angle by being loaded with a standard tire load. Further, in the case of tires for which various standards have been established, the term "standard tire load" refers to a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. In the case of tires for which various standards have not been established, the "standard tire load" conforms to the above standards and refers to the maximum tire load applicable when using the tires.

In the lateral cross section of the first groove 10, the first groove wall 13 includes a first wide top portion 15 between the first groove edge 11 and the groove bottom surface 12, and the first wide top portion 15 is located outside the first groove edge 11 in a groove width direction of the first groove 10. Further, the first wide top portion 15 is positioned in the second rubber layer 7. By adopting the configuration described above, the tire 1 of the present disclosure can maintain the on-snow performance even if the wear of the tread portion 2 progresses. The reasons are as follows.

In the present disclosure, since the first groove walls 13 of the first grooves 10 include the first wide top portions 15, the first grooves 10 can ensure sufficient groove widths even in a worn state in which the tread rubber 2G is so worn that the first wide top portions 15 are exposed, and thus can exert a large snow shearing force. Further, in the present disclosure, since the first wide top portions 15 are located in the second rubber layer 7, the second rubber layer 7, which has a low complex elastic modulus, appears on the ground contacting surface in the above-mentioned worn state, providing a large gripping force on snow. In the present disclosure, the above-mentioned effects are combined to maintain the on-snow performance even in the worn state described above.

A more detailed configuration of the first embodiment will be described below. It should be noted that each configuration described below represents a specific aspect of the first embodiment. Therefore, it goes without saying that the present disclosure can exhibit the effects described above even if it does not have the configuration described below. Further, even if any one of the configurations described below is applied alone to the tire of the present disclosure having the features described above, an improvement in performance corresponding to each configuration can be expected. Furthermore, when some of the configurations described below are applied in combination, a combined improvement in performance can be expected according to the combined configurations.

The tread rubber 2G of the first embodiment includes a third rubber layer 8 connected to the second rubber layer 7 and forming the ground contacting surface (2s). The third rubber layer 8 has a complex elastic modulus $E*3$ smaller than the complex elastic modulus $E*1$ of the first rubber layer 6 and larger than the complex elastic modulus $E*2$ of the second rubber layer 7. The third rubber layer 8 configured as such helps to improve steering stability on dry road surfaces (hereinafter may be simply referred to as "steering stability") when the tire is new and the on-snow performance in a good balance.

It is preferred that each of the complex elastic modulus $E*1$ of the first rubber layer 6, the complex elastic modulus $E*2$ of the second rubber layer 7, and the complex elastic modulus $E*3$ of the third rubber layer 8 is from 4 to 15 MPa. Therefore, not only the on-snow performance, but also the steering stability and anti-wear performance can be improved in a good balance. In addition, it is preferred that the complex elastic modulus $E*3$ of the third rubber layer 8 is greater than the complex elastic modulus $E*2$ of the second rubber layer 7 and smaller than twice the complex elastic modulus $E*2$ of the second rubber layer 7. Thereby, it is possible to suppress deterioration of wear appearance when the second rubber layer 7 is exposed.

Specifically, the complex elastic modulus $E*1$ of the first rubber layer 6 is from 6 to 15 MPa, for example. The complex elastic modulus $E*2$ of the second rubber layer 7 is from 4 to 10 MPa, for example. The complex elastic modulus $E*3$ of the third rubber layer 8 is from 5 to 12 MPa, for example. However, the present disclosure is not limited to these numerical ranges.

It is preferred that a depth (d2) from the ground contacting surface (2s) to a boundary (9a) between the third rubber layer 8 and the second rubber layer 7 is from 45% to 55% of a maximum depth (d1) of each of the first grooves 10. Further, a depth (d3) from the ground contacting surface (2s) to a boundary (9b) between the first rubber layer 6 and the second rubber layer 7 is from 85% to 90% of the maximum depth (d1) of each of the first grooves 10. Therefore, the on-snow performance and the steering stability are improved in a good balance. It should be noted that the depths (d2) and (d3) mean the depths at the groove walls of each of the first grooves 10. In a preferred embodiment, each of the depths (d2) and (d3) is substantially constant along the ground contacting surface (2s).

As shown in FIG. 1. it is preferred that each of the first grooves 10 is inclined at an angle of 15 degrees or more with respect to a tire circumferential direction in the tread plan view. Each of the first grooves 10 has an angle θa of 30 degrees or more and 80 degrees or less with respect to the tire circumferential direction, for example. The first grooves 10 configured as such help to improve traction performance and braking performance when running on snow.

Each of the first grooves 10 of the first embodiment has a groove width decreasing from a respective one of the tread edges (Te) toward the tire equator (C), for example. The first grooves 10 configured as such can strongly compress the snow therein and thus can exert a large snow shearing force. It should be noted that each of the first grooves 10 of the first embodiment preferably has the cross-sectional configuration shown in FIG. 2 over substantially the entirety thereof.

As shown in FIG. 2, in the cross section of each of the first grooves 10, a distance L1 in the groove width direction from the first groove edge 11 to the first wide top portion 15 is 10% or less of a groove width W1 of each of the first grooves 10 measured at the ground contacting surface (2s), for example. Further, a groove width W2 of each of the first grooves 10 measured at a depth of the first wide top portion 15 is 100% or more and 120% or less of the groove width W1 of each of the first grooves 10 measured at the ground contacting surface (2s). As a result, the above effects can be obtained while maintaining the steering stability and the anti-wear performance. In the first embodiment, as later described, a second groove wall 23 is configured similarly to the first groove wall 13. In other words, the second groove wall 23 has a second wide top portion 25 equivalent to the first wide top portion 15. When the first and second wide top portions 15 and 25 are formed on the first groove wall 13 and the second groove wall 23 respectively as in the first embodiment, the groove width W2 corresponds to the distance in the groove width direction between the first wide top portion 15 and the second wide top portion 25. Further, in other embodiments of the present disclosure, when only the first wide top portion 15 is formed in the first groove wall 13 of each of the first grooves 10, the groove width W2 means the distance between two groove walls at the depth of the first wide top portion 15 of the first groove wall 13.

The first wide top portion 15 is located radially inside the boundary (9a) between the second rubber layer 7 and the third rubber layer 8. Further, it is preferred that a depth (d4) from the first groove edge 11 to the first wide top portion 15 is from 45% to 55% of the maximum depth (d1) of each of the first grooves 10. As a result, when the tread portion 2 is moderately worn, the first wide top portion 15 is exposed to the ground contacting surface, therefore, it is possible that the on-snow performance is maintained more reliably.

The first groove wall 13 includes an outer portion 16, an inner portion 17, and a middle portion 18. The outer portion 16 extends radially inward from the first groove edge 11 while being inclined toward a groove center of a respective one of the first grooves. The inner portion 17 extends radially inward from the first wide top portion 15 while being inclined toward the groove center of a respective one of the first grooves. The middle portion 18 is arranged between the outer portion 16 and the inner portion 17 and is inclined to a side opposite to the outer portion 16 and the inner portion 17. The first groove wall 13 configured as such, when snow enters the groove, can strongly compress the snow by the inclination of the groove wall, and thus can exert a large snow shearing force. Specifically, when the tire is new, the outer portion 16 can strongly compress the snow, and when the first wide top portion 15 is exposed, the inner portion 17 can strongly compress the snow.

The inner portion 17 is inclined with respect to a depth direction of a respective one of the first grooves 10 at an angle θ2 larger than an angle θ1 of the outer portion 16 with respect to the depth direction. Each of the angle θ1 and the angle θ2 is 20 degrees or less. Specifically, the angle θ1 is from 5 to 10 degrees, and the angle θ2 is from 10 to degrees. Thereby, the steering stability and the on-snow performance are improved in a good balance.

The angle of the middle portion 18 with respect to the depth direction is from to 65 degrees, for example. Therefore, the groove width W2 can be ensured to be large, thereby, the on-snow performance can be effectively maintained.

Each of the first grooves 10 in the first embodiment includes in a cross section thereof the second groove wall 23 having a symmetrical shape with the first groove wall 13. In other words, the second groove wall 23 is lineally symmetrical with the first groove wall 13 with respect to a groove centerline (not shown) in the cross section of each of the first grooves 10. Accordingly, the second groove wall 23 has the same configuration as the first groove wall 13, and the configuration of the first groove wall 13 described above can be applied to the second groove wall 23. In the first embodiment, it is possible that the first groove wall 13 and the second groove wall 23 configured as such together effectively maintain the on-snow performance.

Figure 3:
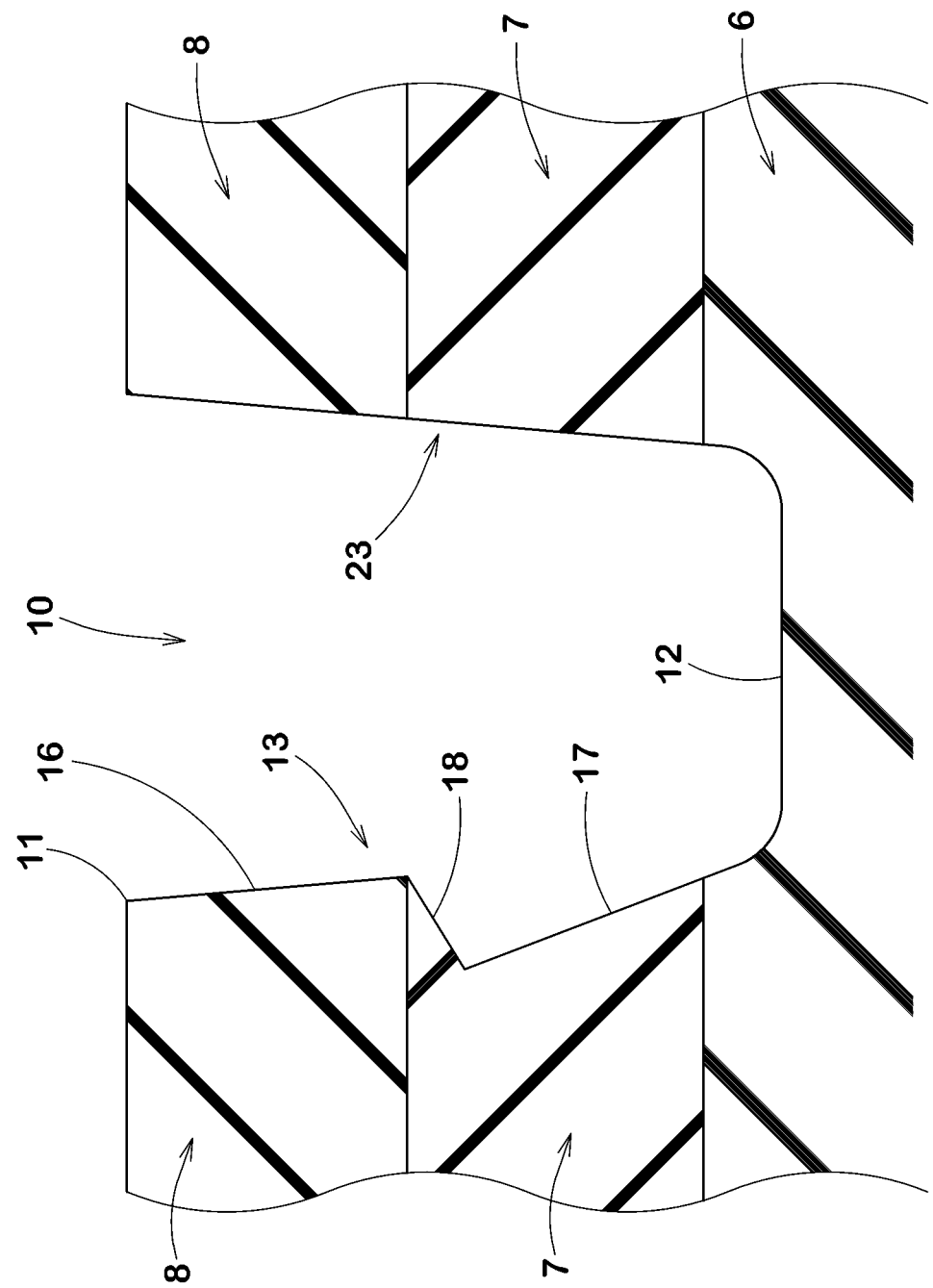
FIG. 3 is a lateral cross-sectional view of the tread rubber and the first groove in the second embodiment of the present disclosure.

FIG. 3 shows an enlarged cross-sectional view of one of the first grooves 10 according to the second embodiment of the present disclosure. In the second embodiment illustrated in FIG. 3, elements common to the first embodiment are assigned with the same reference signs, and the above-described configurations can be applied. As shown in FIG. 3, in the second embodiment, the second groove wall 23 is configured as a conventional groove wall constantly inclined toward the groove center from the groove edge to the groove bottom surface 12. Even in the second embodiment, as long as the first groove wall 13 described above is included, the on-snow performance can be maintained even if wear of the tread portion 2 progresses.

Further, in the second embodiment, the rigidity of the land region on the second groove wall 23 side can be maintained. Therefore, when the first grooves 10 are inclined as shown in FIG. 1, if the second groove walls 23 are arranged on the heel side in the tire rotational direction (R), for example, it is possible that the above-mentioned effect (maintenance of the on-snow performance) is obtained while the braking performance on a dry road surface is significantly increased. On the other hand, if the second groove walls 23 are arranged on a toe side (trailing side) in the tire rotational direction (R), the above effect (maintenance of the on-snow performance) can be obtained while the traction performance on a dry road surface is significantly increased.

While detailed description has been made of embodiments of the present disclosure, the present disclosure can be embodied in various forms without being limited to the specific embodiments illustrated above.

EXAMPLES

Pneumatic tires of size 225/65R17 having the basic structure shown in FIG. 1 and the first grooves shown in FIG. 2 were made by way of test according to the specification listed in table 1. As Reference 1, tires having the basic structure shown in FIG. 1 and first grooves (a) having a conventional cross-sectional shape shown in FIG. 4 were made by way of test. It should be noted that a base rubber layer (b) of the tread rubber of the Reference 1 was formed by the same rubber as the first rubber layer of the first and the second embodiments and a cap rubber layer (c) of the tread rubber of the Reference 1 was formed by the same rubber as the second rubber layer of the first and the second embodiments.

Figure 5:
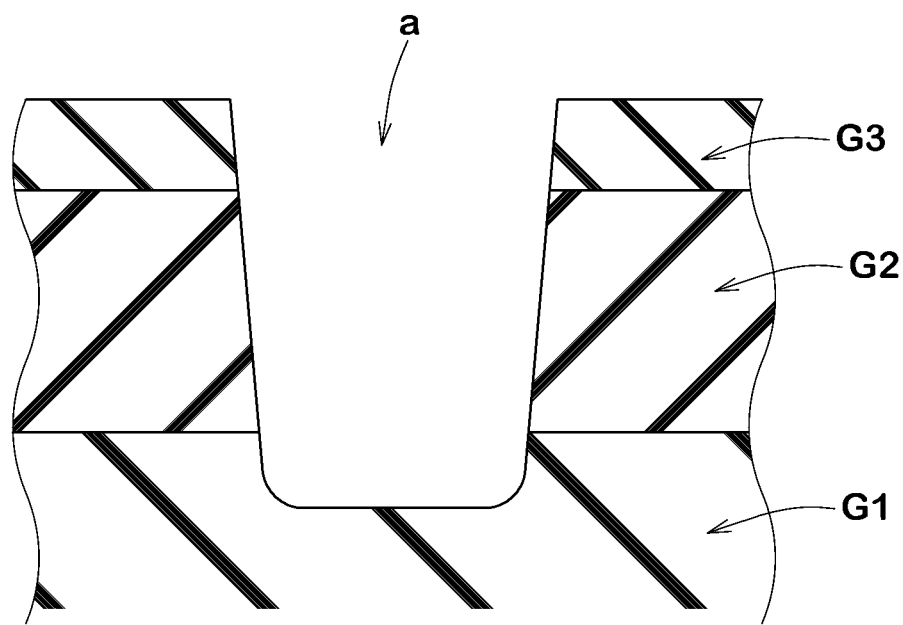
FIG. 5 is a lateral cross-sectional view of the tread rubber and the first groove of Reference 2.

As References, tires having the basic tread pattern shown in FIG. 1 and the first grooves (a) having a conventional cross-sectional shape shown in FIG. 5 were made by way of test. It should be noted that the tread rubbers of the Reference 1 and the Reference 2 were formed by rubber layers G1, G2, and G3 same as the first rubber layer 6, the second rubber layer 7, and the third rubber layer 8 of the first and the second embodiments. These tires in the References 1 and 2 were substantially the same as the tires in Example except for the above matters. The test tires were tested for the on-snow performance in various wear conditions. Common specifications and test methods for the test tires were as follows.

Test vehicle: Displacement 2000cc, all-wheel drive
Test tire mounting position: all wheels
Tire rim: 17×6.5J
Tire inner pressure: 230 kPa on all wheels <On-Snow Performance in Various Wear Conditions>

While a driver drove the above test vehicle on a snowy road, the on-snow performance of each test tire in new, 50% wear, and 80% wear conditions was evaluated by the driver's sensory perception. The results are indicated by an index based on the on-snow performance of the Reference 1 in the new condition being 100, wherein the larger the numerical value, the larger the frictional force is.

The test results are shown in Table 1.

TABLE 1

Figure 4:
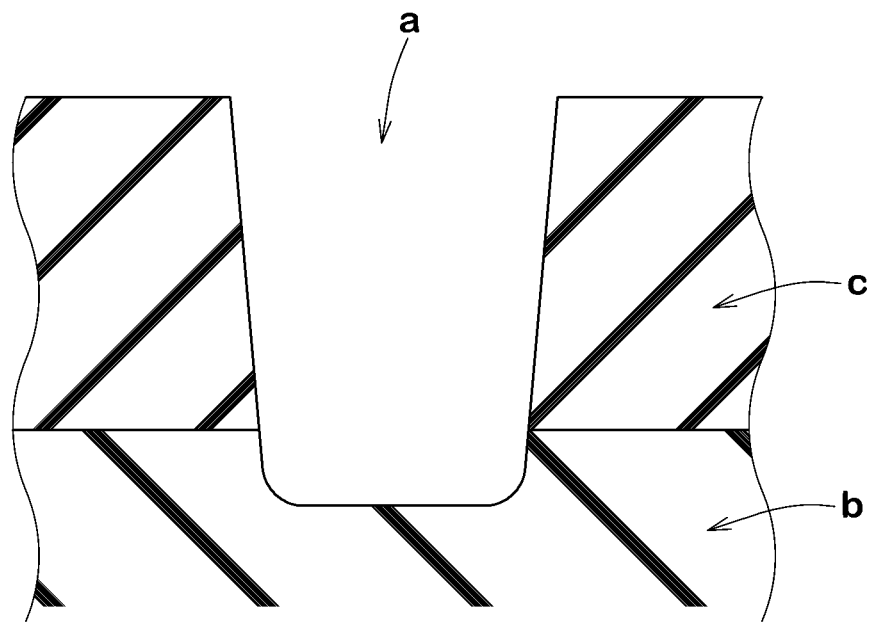
FIG. 4 is a lateral cross-sectional view of the tread rubber and the first groove of Reference 1.

|  | Ref. 1 | Ref. 2 | Example |
|---|---|---|---|
| Figure showing cross section of First Groove | FIG. 4 | FIG. 5 | FIG. 2 |
| On-snow performance when new [evaluation point] | 100 | 100 | 105 |
| On-snow performance at 50% wear [evaluation point] | 90 | 95 | 100 |
| On-snow performance at 80% wear [evaluation point] | 70 | 85 | 90 |

As shown in Table 1, the tires in the Example have the on-snow performance of 100 points in the 50% wear condition and the on-snow performance of 90 points in the 80% wear condition. It can be seen that the tires in the Example have superior results to the tires in the References 1 and 2. In other words, it is confirmed that the tires in the Example can maintain the on-snow performance even when the tread wears.

Statement of Disclosure

The present disclosure includes the following aspects.

[Present Disclosure 1]

A tire including a tread portion, wherein
the tread portion includes a ground contacting surface, and at least one first groove opening at the ground contacting surface,
a tread rubber forming the tread portion includes a first rubber layer not exposed at the ground contacting surface and a second rubber layer connected to the first rubber layer on an outer side in a tire radial direction,
the second rubber layer has a complex elastic modulus $E^*2$ smaller than a complex elastic modulus $E^*1$ of the first rubber layer,
the or each first groove includes a first groove edge, the first groove edge being one of two groove edges of the or each first groove appearing on the ground contacting surface, a groove bottom surface located radially inside the second rubber layer, and a first groove wall connecting the first groove edge and the groove bottom surface,
in a lateral cross section of the or each first groove, the first groove wall includes a first wide top portion between the first groove edge and the groove bottom surface,
the first wide top portion is located outside the first groove edge in a groove width direction of the or each first groove, and
the first wide top portion is positioned in the second rubber layer.

[Present Disclosure 2]

The tire according to Present Disclosure 1, wherein the or each first groove has a groove width measured at a depth of the first wide top portion in a range from 100% to 120% of the groove width measured at the ground contacting surface.

[Present Disclosure 3]

The tire according to Present Disclosure 1 or 2, wherein
the tread rubber includes a third rubber layer connected to the second rubber layer and forming the ground contacting surface, and
the third rubber layer has a complex elastic modulus $E^*3$ smaller than the complex elastic modulus $E^*1$ of the first rubber layer and larger than the complex elastic modulus $E^*2$ of the second rubber layer.

[Present Disclosure 4]

The tire according to Present Disclosure 1 or 2, wherein a distance in the groove width direction from the first groove edge to the wide top portion is 10% or less of a groove width of the or each first groove at the ground contacting surface in the lateral cross section.

[Present Disclosure 5]

The tire according to Present Disclosure 1 or 2, wherein a depth from the first groove edge to the wide top portion is from 45% to 55% of a maximum depth of the or each first groove.

[Present Disclosure 6]

The tire according to Present Disclosure 1 or 2, wherein
the first groove wall includes an outer portion, an inner portion, and a middle portion,
the outer portion extends radially inward from the first groove edge while being inclined toward a groove center of the or each first groove,
the inner portion extends radially inward from the wide top portion while being inclined toward the groove center, and
the middle portion is arranged between the outer portion and the inner portion and is inclined to a side opposite to the outer portion and the inner portion.

[Present Disclosure 7]

The tire according to Present Disclosure 6, wherein the inner portion is inclined with respect to a depth direction of the or each first groove at an angle $\theta 2$ larger than an angle $\theta 1$ of the outer portion with respect to the depth direction.

[Present Disclosure 8]

The tire according to Present Disclosure 7, wherein each of the angle $\theta 1$ and the angle $\theta 2$ is 20 degrees or less.

[Present Disclosure 9]

The tire according to Present Disclosure 1 or 2, wherein the or each first groove is inclined at an angle of 15 degrees or more with respect to a tire circumferential direction in a plan view of the tread portion.

[Present Disclosure 10]

The tire according to Present Disclosure 1 or 2, wherein the or each first groove includes a second groove wall having a symmetrical shape with the first groove wall in the lateral cross section.

[Present Disclosure 11]

The tire according to Present Disclosure 1 or 2, wherein the tread rubber includes a third rubber layer connected to the second rubber layer and forming the ground contacting surface, and each of the complex elastic modulus $E*1$ of the first rubber layer, the complex elastic modulus $E*2$ of the second rubber layer, and a complex elastic modulus $E*3$ of the third rubber layer is from 4 to 15 MPa.

[Present Disclosure 12]

The tire according to Present Disclosure 11, wherein the complex elastic modulus $E*3$ is greater than the complex elastic modulus $E*2$ and smaller than twice the complex elastic modulus $E*2$.

[Present Disclosure 13]

The tire according to Present Disclosure 11, wherein a depth from the ground contacting surface to a boundary between the third rubber layer and the second rubber layer is from 45% to 55% of a maximum depth of the or each first groove.

[Present Disclosure 14]

The tire according to Present Disclosure 1 or 2, wherein a depth from the ground contacting surface to a boundary between the first rubber layer and the second rubber layer is from 85% to 90% of a maximum depth of the or each first groove.

DESCRIPTION OF REFERENCE SIGNS 2 tread portion
2s ground contacting surface
2G tread rubber
6 first rubber layer
7 second rubber layer
10 first groove
11 first groove edge
12 groove bottom surface
13 first groove wall
15 first wide top portion
$E*1$ complex elastic modulus of first rubber layer
$E*2$ complex elastic modulus of second rubber layer

The invention claimed is:

1. A tire comprising a tread portion and having a tire equator, wherein
the tread portion includes a ground contacting surface, and at least one first groove opening at the ground contacting surface,
the tread portion is formed from a tread rubber that includes a first rubber layer not exposed at the ground contacting surface and a second rubber layer connected to the first rubber layer on an outer side in a tire radial direction,
the second rubber layer has a complex elastic modulus $E*2$ smaller than a complex elastic modulus $E*1$ of the first rubber layer,
the or each first groove has a groove width decreasing from a respective one of tread edges toward the tire equator and includes a first groove edge that is one of two groove edges of the or each first groove appearing on the ground contacting surface, a groove bottom surface located radially inside the second rubber layer, and a first groove wall connecting the first groove edge and the groove bottom surface,
in a lateral cross section of the or each first groove, the first groove wall includes a first wide top portion between the first groove edge and the groove bottom surface,
the first wide top portion is located outside the first groove edge in a groove width direction of the or each first groove, and
the first wide top portion is positioned in the second rubber layer.

2. The tire according to claim 1, wherein the or each first groove has a groove width measured at a depth of the first wide top portion in a range from 100% to 120% of the groove width measured at the ground contacting surface.

3. The tire according to claim 1, wherein
the tread rubber includes a third rubber layer connected to the second rubber layer and forming the ground contacting surface, and
the third rubber layer has a complex elastic modulus $E*3$ smaller than the complex elastic modulus $E*1$ of the first rubber layer and larger than the complex elastic modulus $E*2$ of the second rubber layer.

4. The tire according to claim 3, wherein the groove bottom surface is located in the first rubber layer.

5. The tire according to claim 3, wherein the first wide top portion is located radially inside a boundary between the second rubber layer and the third rubber layer.

6. The tire according to claim 1, wherein a distance in the groove width direction from the first groove edge to the wide top portion is 10% or less of a groove width of the or each first groove at the ground contacting surface in the lateral cross section.

7. The tire according to claim 1, wherein a depth from the first groove edge to the wide top portion is from 45% to 55% of a maximum depth of the or each first groove.

8. The tire according to claim 1, wherein
the first groove wall includes an outer portion, an inner portion, and a middle portion,
the outer portion extends radially inward from the first groove edge while being inclined toward a groove center of the or each first groove,
the inner portion extends radially inward from the wide top portion while being inclined toward the groove center, and
the middle portion is arranged between the outer portion and the inner portion and is inclined to a side opposite to the outer portion and the inner portion.

9. The tire according to claim 8, wherein the inner portion is inclined with respect to a depth direction of the or each first groove at an angle $\theta 2$ larger than an angle $\theta 1$ of the outer portion with respect to the depth direction.

10. The tire according to claim 9, wherein each of the angle $\theta 1$ and the angle $\theta 2$ is 20 degrees or less.

11. The tire according to claim 9, wherein
the angle $\theta 1$ is from 5 to 10 degrees, and
the angle $\theta 2$ is from 10 to 20 degrees.

12. The tire according to claim 11, wherein the middle portion is inclined at an angle from 55 to 65 degrees with respect to the depth direction.

13. The tire according to claim 1, wherein the or each first groove is inclined at an angle of 15 degrees or more with respect to a tire circumferential direction in a plan view of the tread portion.

14. The tire according to claim 1, wherein
the tread rubber includes a third rubber layer connected to the second rubber layer and forming the ground contacting surface, and
each of the complex elastic modulus $E^*1$ of the first rubber layer, the complex elastic modulus $E^*2$ of the second rubber layer, and a complex elastic modulus $E^*3$ of the third rubber layer is from 4 to 15 MPa.

15. The tire according to claim 14, wherein the complex elastic modulus $E^*3$ is greater than the complex elastic modulus $E^*2$ and smaller than twice the complex elastic modulus $E^*2$.

16. The tire according to claim 15, wherein
the complex elastic modulus $E^*1$ of the first rubber layer is from 6 to 15 MPa,
the complex elastic modulus $E^*2$ of the second rubber layer is from 4 to 10 MPa, and
the complex elastic modulus $E^*3$ of the third rubber layer is from 5 to 12 MPa.

17. The tire according to claim 14, wherein a depth from the ground contacting surface to a boundary between the third rubber layer and the second rubber layer is from 45% to 55% of a maximum depth of the or each first groove.

18. The tire according to claim 1, wherein a depth from the ground contacting surface to a boundary between the first rubber layer and the second rubber layer is from 85% to 90% of a maximum depth of the or each first groove.

19. A tire comprising a tread portion, wherein
the tread portion includes a ground contacting surface, and at least one first groove opening at the ground contacting surface,
the tread portion is formed from a tread rubber that includes a first rubber layer not exposed at the ground contacting surface and a second rubber layer connected to the first rubber layer on an outer side in a tire radial direction,
the second rubber layer has a complex elastic modulus $E^*2$ smaller than a complex elastic modulus $E^*1$ of the first rubber layer,
the or each first groove includes a first groove edge that is one of two groove edges of the or each first groove appearing on the ground contacting surface, a groove bottom surface located radially inside the second rubber layer, and a first groove wall connecting the first groove edge and the groove bottom surface,
in a lateral cross section of the or each first groove, the first groove wall includes a first wide top portion between the first groove edge and the groove bottom surface,
the first wide top portion is located outside the first groove edge in a groove width direction of the or each first groove,
the first wide top portion is positioned in the second rubber layer, and
a depth from the ground contacting surface to a boundary between the first rubber layer and the second rubber layer is from 85% to 90% of a maximum depth of the or each first groove.

20. A tire comprising a tread portion, wherein
the tread portion includes a ground contacting surface, and at least one first groove opening at the ground contacting surface,
the tread portion is formed from a tread rubber that includes a first rubber layer not exposed at the ground contacting surface, a second rubber layer connected to the first rubber layer on an outer side in a tire radial direction, and a third rubber layer connected to the second rubber layer and forming the ground contacting surface,
the second rubber layer has a complex elastic modulus $E^*2$ smaller than a complex elastic modulus $E^*1$ of the first rubber layer,
the third rubber layer has a complex elastic modulus $E^*3$ smaller than the complex elastic modulus $E^*1$ of the first rubber layer and larger than the complex elastic modulus $E^*2$ of the second rubber layer,
the or each first groove includes a first groove edge that is one of two groove edges of the or each first groove appearing on the ground contacting surface, a groove bottom surface located radially inside the second rubber layer, and a first groove wall connecting the first groove edge and the groove bottom surface,
in a lateral cross section of the or each first groove, the first groove wall includes a first wide top portion between the first groove edge and the groove bottom surface,
the first wide top portion is located outside the first groove edge in a groove width direction of the or each first groove,
the first wide top portion is positioned in the second rubber layer, and
the groove bottom surface is located in the first rubber layer.

* * * * *